Figure 1:
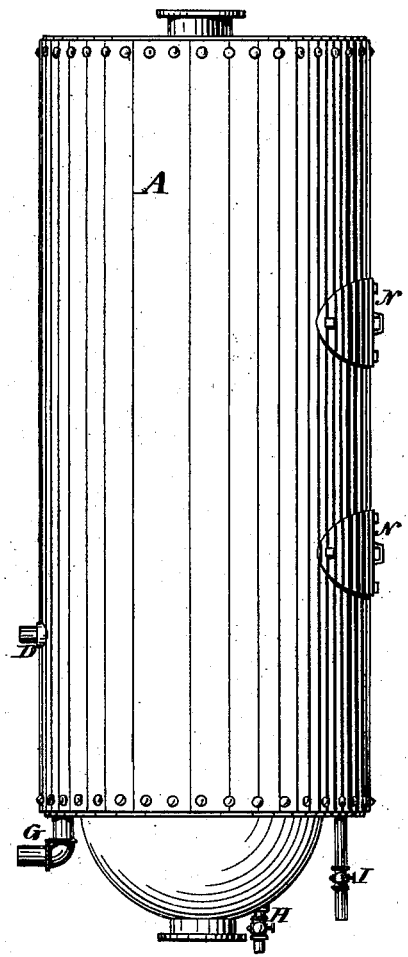
Figure 2:
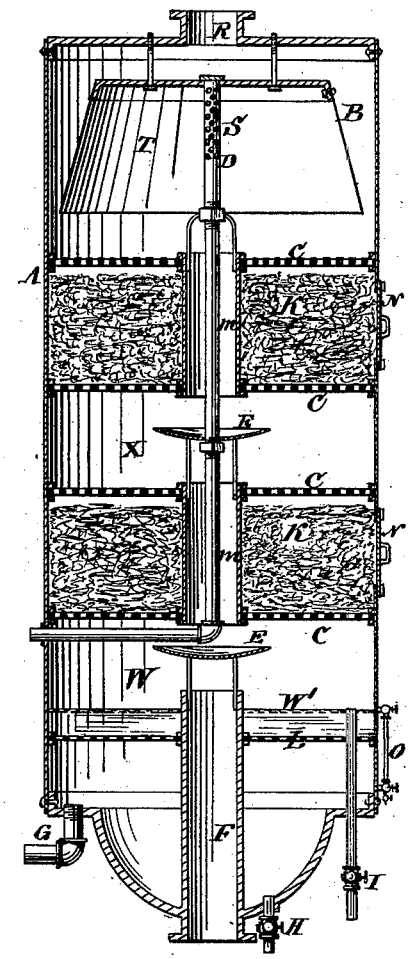

W. J. AUSTIN.
Feed Water Heater and Filter.

No. 207,337. Patented Aug. 27, 1878.

Witnesses
J. J. Masson
A. Scott

Inventor:
William Jarvis Austin
by E. E. Masson
atty.

UNITED STATES PATENT OFFICE.

WILLIAM J. AUSTIN, OF CHICAGO, ILLINOIS.

IMPROVEMENT IN FEED-WATER HEATERS AND FILTERS.

Specification forming part of Letters Patent No. 207,337, dated August 27, 1878; application filed April 24, 1877.

*To all whom it may concern:*

Be it known that I, WILLIAM J. AUSTIN, of the city of Chicago, in the county of Cook and State of Illinois, have invented a new and useful Improvement in Feed-Water Heaters and Filters, which improvement is fully set forth in the following specification, reference being had to the accompanying drawings.

This invention is an improvement on my invention patented November 2, 1875, No. 169,332. The manner in which it differs from that patented invention will be at once apparent on the examination of the same.

My invention relates to the new combination and arrangement of parts, whereby the apparatus is rendered more compact and effective.

My invention consists in filtering-diaphragms formed of filtering material inclosed between perforated plates or grates, provided with a vertical pipe, preferably centrally located, through which exhaust-steam is admitted from one compartment of the heater and filter to the other, and a vertical pipe to bring the cold water upward through the said exhaust-steam pipe against a deflector, in which it is sprayed and directed to fall upon the upper grate of the filter.

In the drawing, A is the shell of my heater and filter. B is the top disk of the same, against which the exhaust-steam strikes. C C are grates, between which is held the filtering material K, which, with the grates, composes what I designate as a "diaphragm." D is a cold-water feed-pipe that sprays through the perforation S under the disk B. E E are the middle and lower disks, against which the exhaust-steam strikes before passing up to the disk B. F is the pipe which conducts the exhaust-steam into the heater. G is a pipe through which the hot filtered water is drawn off into the boiler. H is a pipe through which the sediment that settles in the bottom of the heater can be blown off. I is a pipe through which the filtered water can overflow when it reaches a certain point in the heater. L is a strainer, designed to catch any impurities that escape from the diaphragms C C K. $m$ is an opening through the center of the diaphragms, through which the pipe D passes, and through which opening $m$ the exhaust-steam passes, surrounding the pipe D. N are man-holes to enable the filtering material K to be removed and renewed. O is a water-gage, showing the height of the water in the heater.

W′ is the water-line, and when the water rises above this water-line it flows off through the pipe I.

The plates C C are perforated, or are in the form of grates, and the filtering material K is placed between them. The water is let into the pipe D, and, spraying out against the disk B, falls on the top of the grates C, and passes through them and the filtering material, drops down into the lower diaphragm, through which it passes, and in the same way drops down into the water-chamber W. The exhaust-steam, spraying out of the exhaust-steam pipe F, strikes the lower disk, E, deflects and fills the chamber W, heating the water dropping into the same from the lower diaphragm, then passing upward through the orifice $m$ $m$, heating in its passage the cold-water pipe D, and striking the middle disk, E, filling that chamber, X, and heating the water falling into the same from the upper diaphragms; then, passing upward through the orifice $m$ into the chamber T, heats the water spraying into the same from the perforation S; then any steam remaining uncondensed passes around the disk B and out of the orifice R.

The filtering material K can be excelsior, hay, straw, sawdust, charcoal, or any suitable material desired.

The lime and other impurities taken from the water is held in the filtering material K, which is renewed as often as it becomes saturated. All impurities are extracted from the water that falls into the chamber W, leaving it filtered and almost as pure as distilled water, thereby rendering any coating on the boiler in which this water is used impossible.

What I claim as new and as my invention and wish to secure by Letters Patent, is—

1. The diaphragms C C K, in combination with the pipe D, perforations S, chambers W X, and T, disks B E E, and the exhaust-pipe F, in the manner shown and described, and for the purpose set forth.

2. In combination with diaphragms formed of filtering material inclosed between perforated plates or grates, the vertical steam-passage $m$ and deflector B, each having in its center the vertical cold-water pipe D, with spraying-perforations S at its upper extremity, substantially as shown and described.

WILLIAM JARVIS AUSTIN.

Witnesses:
F. J. SEYBOLD,
JOHN S. AUSTIN.